United States Patent
Uchida et al.

(10) Patent No.: US 9,464,712 B2
(45) Date of Patent: Oct. 11, 2016

(54) VEHICLE

(71) Applicant: TOYOTA JIDOSHA KABUSHIKI KAISHA, Toyota-shi, Aichi-ken (JP)

(72) Inventors: Kenji Uchida, Nagoya (JP); Ryoji Sato, Toyohashi (JP)

(73) Assignee: Toyota Jidosha Kabushiki Kaisha, Toyota-shi, Aichi-ken (JP)

( * ) Notice: Subject to any disclaimer, the term of this patent is extended or adjusted under 35 U.S.C. 154(b) by 0 days.

(21) Appl. No.: 14/802,520

(22) Filed: Jul. 17, 2015

(65) Prior Publication Data
US 2016/0076639 A1  Mar. 17, 2016

(30) Foreign Application Priority Data
Sep. 12, 2014  (JP) ................... 2014-186595

(51) Int. Cl.
| | |
|---|---|
| *B60W 10/06* | (2006.01) |
| *B60W 10/08* | (2006.01) |
| *B60W 10/10* | (2012.01) |
| *F16H 61/02* | (2006.01) |
| *B60W 20/00* | (2016.01) |
| *F16H 61/00* | (2006.01) |

(52) U.S. Cl.
CPC .......... *F16H 61/0213* (2013.01); *B60W 10/10* (2013.01); *B60W 20/30* (2013.01); *F16H 2061/0087* (2013.01); *F16H 2061/0223* (2013.01)

(58) Field of Classification Search
None
See application file for complete search history.

(56) References Cited

U.S. PATENT DOCUMENTS

| | | | |
|---|---|---|---|
| 2009/0118949 A1* | 5/2009 | Heap ...................... | B60K 6/445 701/55 |
| 2012/0072064 A1* | 3/2012 | Kumazaki ........... | F16H 61/0213 701/22 |
| 2013/0297132 A1* | 11/2013 | Yaguchi ................ | B60K 6/445 701/22 |
| 2013/0297136 A1* | 11/2013 | Yamanaka ............... | B60K 6/48 701/22 |

FOREIGN PATENT DOCUMENTS

JP          2013-72686          4/2013

* cited by examiner

*Primary Examiner* — Edwin A Young
(74) *Attorney, Agent, or Firm* — Finnegan, Henderson, Farabow, Garrett & Dunner, LLP

(57) ABSTRACT

A vehicle includes a motor, a resolver which detects a rotation angle of the motor, an automatic transmission which shifts rotation of the motor and transmits the shifted rotation to a drive shaft, and an ECU which performs learning control for correcting an error of the resolver and shift control of the automatic transmission. The ECU controls the automatic transmission such that, when the learning control is performed, a gear ratio becomes higher at a prescribed vehicle speed, than that when the learning control is not performed. By controlling the automatic transmission as described above, even when the vehicle is traveling at a low speed, a rotation speed of the motor easily reaches a rotation speed at and above which the learning control of the resolver can be performed. Accordingly, an opportunity to perform the learning control of the resolver can be obtained early.

6 Claims, 5 Drawing Sheets

VEHICLE

This nonprovisional application is based on Japanese Patent Application No. 2014-186595 filed on Sep. 12, 2014 with the Japan Patent Office, the entire contents of which are hereby incorporated by reference.

BACKGROUND OF THE INVENTION

1. Field of the Invention

The present invention relates to a vehicle, and in particular to learning control for correcting an error of a resolver which detects a rotation angle of a motor.

2. Description of the Background Art

An electrically powered vehicle such as an electric vehicle and a hybrid vehicle is equipped with a motor which generates a drive force. In order to control the motor with accuracy, it is necessary to detect a rotation angle of the motor. A resolver is a rotation angle sensor which has a very simple structure and enables normal and highly accurate angle detection under a situation in which temperature, vibration, and oil environments are very severe. The resolver is widely used in electrically powered vehicles.

It is known that an electric signal output by a resolver includes an error resulting from a gap between axial centers of a rotor and a stator of the resolver, or the like. Japanese Patent Laying-Open No. 2013-72686 discloses a technique for appropriately correcting an error included in a rotation angle detected using a resolver.

In order to control a motor with accuracy, it is desirable to perform learning control which corrects an error of a resolver and stores the result. In order to perform such learning control of the resolver for the motor, a rotation speed of the motor should be more than or equal to a prescribed speed. When the rotation speed of the motor is more than or equal to the prescribed speed, it can be considered that the rotation angle of the motor increases equally. Thus, if fluctuation occurs in a change amount of the angle detected by the resolver, this can be considered as an error.

Generally, most systems using a motor are not provided with a transmission, because they can output a high torque even when the motor is rotated at a low speed. However, a hybrid vehicle may incorporate an automatic transmission, because it also uses an internal combustion engine which cannot output a high torque at a low rotation speed. Further, even an electric vehicle may incorporate an automatic transmission in order to enhance acceleration performance during high-speed traveling, and the like.

In a vehicle in which an automatic transmission is incorporated into an output shaft of a motor as described above, the automatic transmission can control a rotation speed, and thus the vehicle may be controlled to suppress the rotation speed of the motor to be low. Accordingly, there is a possibility that an opportunity to perform learning control of a resolver cannot be ensured as desired.

SUMMARY OF THE INVENTION

An object of the present invention is to provide a vehicle which has an increased opportunity to learn about a resolver and can complete learning early.

In summary, the present invention is directed to a vehicle, including a motor, a resolver which detects a rotation angle of the motor, an automatic transmission which shifts rotation of the motor and transmits the shifted rotation to a drive shaft for rotating drive wheels, and a control device which performs learning control for correcting an error of the resolver and shift control of the automatic transmission. The control device controls the automatic transmission at a prescribed vehicle speed such that a shift stage of the automatic transmission while the learning control is performed is set to be lower than a shift stage of the automatic transmission while the learning control is not performed.

By controlling the automatic transmission as described above, when the vehicle is traveling at the above vehicle speed, a rotation speed of the motor easily reaches a rotation speed at and above which the learning control of the resolver can be performed. Accordingly, an opportunity to perform the learning control of the resolver can be obtained early.

Preferably, before the learning control is completed, the control device controls the automatic transmission so as not to shift up a shift stage of the automatic transmission above a prescribed shift stage until a vehicle speed reaches a prescribed vehicle speed from zero, and, after the learning control is completed, the control device controls the automatic transmission so as to shift up the shift stage of the automatic transmission above the prescribed shift stage before the vehicle speed reaches the prescribed vehicle speed from zero.

Preferably, before the learning control is completed, the control device fixes a shift stage of the automatic transmission to a first stage until a vehicle speed reaches a prescribed vehicle speed from zero, and, after the learning control is completed, the control device shifts up the shift stage of the automatic transmission from the first stage to a second stage before the vehicle speed reaches the prescribed vehicle speed from zero.

By controlling the automatic transmission as described above, even when the vehicle is traveling at a low speed and it is difficult for the rotation speed of the motor to reach the rotation speed required to perform the learning control of the resolver, the rotation speed of the motor easily reaches the rotation speed at and above which the learning control of the resolver can be performed. Accordingly, an opportunity to perform the learning control of the resolver can be obtained early.

Preferably, the control device further performs drive control of the motor based on an output of the resolver. With such a configuration, the learning control of the resolver is completed early, and thus highly accurate drive control of the motor can be started early.

Preferably, the vehicle further includes an internal combustion engine. Namely, also in a hybrid vehicle including a motor and an internal combustion engine, an opportunity to perform the learning control of the resolver can be obtained early.

More preferably, the vehicle further includes a power generator which receives a torque of the internal combustion engine and generates electric power. Namely, also in a series type or series parallel type hybrid vehicle including a motor and an internal combustion engine, an opportunity to perform the learning control of the resolver can be obtained early.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

Figure 1:
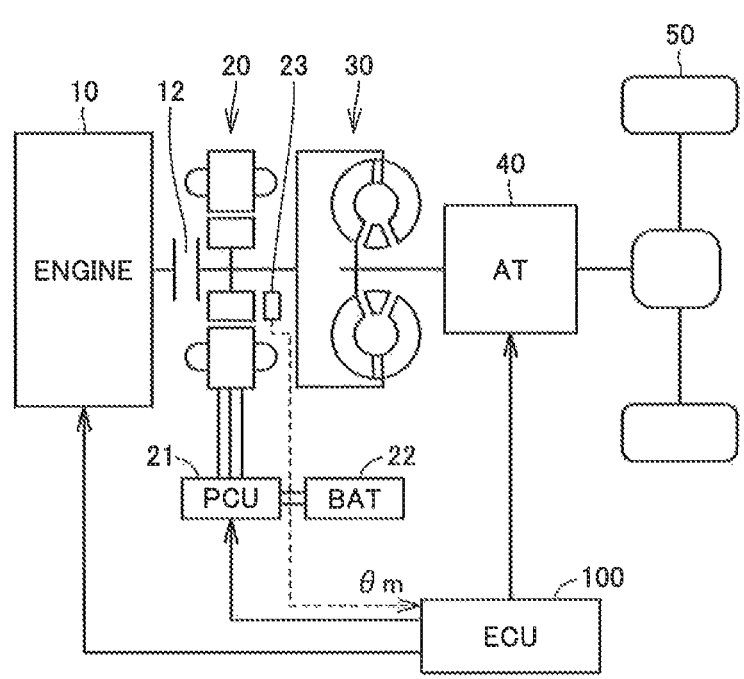
FIG. 1 is an overall configuration diagram of a vehicle 1 in a first embodiment.

Hereinafter, embodiments of the present invention will be described in detail with reference to the drawings. It should be noted that identical or corresponding parts in the drawings will be designated by the same reference numerals, and the description thereof will not be repeated.

First Embodiment

FIG. 1 is an overall configuration diagram of a vehicle 1 in a first embodiment. Vehicle 1 includes an engine 10, a clutch 12, a motor 20, a power control unit (PCU) 21, a battery 22, a torque converter 30, an automatic transmission 40, drive wheels 50, and an electronic control unit (ECU) 100.

Engine 10 is an internal combustion engine such as a gasoline engine or a diesel engine. A crankshaft of engine 10 and a rotation shaft of motor 20 are coupled with clutch 12 interposed therebetween.

The rotation shaft of motor 20 is coupled onto a motive power transmission path between the crankshaft of engine 10 and an input shaft of torque converter 30. An output shaft of torque converter 30 is coupled to an input shaft of automatic transmission 40. An output shaft of automatic transmission 40 is coupled to drive wheels 50 with a differential device interposed therebetween.

Motor 20 is, for example, a three-phase alternating current (AC) rotating electric machine. Motor 20 is driven by electric power supplied from battery 22 through PCU 21.

Battery 22 is a power storage device which stores direct current (DC) power for driving motor 20. Battery 22 has a high voltage, for example, approximately 200 V. Typically, battery 22 is configured to include a nickel hydrogen battery or a lithium ion battery. Instead of battery 22, a large capacity capacitor can also be adopted.

Motive power from at least one of engine 10 and motor 20 is transmitted to drive wheels 50, through torque converter 30 and automatic transmission 40. Namely, vehicle 1 is a hybrid vehicle which can travel using the motive power from at least one of engine 10 and motor 20.

Further, when battery 22 should be charged (for example, when the remaining capacity of battery 22 is reduced below a prescribed value), when a user operates an electric load such as a defroster or an air conditioner, and the like, motor 20 is controlled to serve as a generator generating electric power using a portion of the motive power from engine 10.

Automatic transmission 40 is a staged automatic transmission which can selectively form a plurality of gear stages having different gear ratios (i.e., the ratio of a rotation speed of the input shaft to a rotation speed of the output shaft of automatic transmission 40). When vehicle 1 is caused to travel in a forward direction, any gear stage between a first stage on the lowest speed side (i.e., a side with the highest gear ratio) and an upper limit gear stage on the highest speed side (i.e., a side with the lowest gear ratio) is formed in automatic transmission 40.

Further, although not shown, vehicle 1 is provided with a plurality of sensors for detecting various physical amounts required to control vehicle 1, such as the amount of depression of an accelerator pedal by the user, the state of battery 22 (for example, remaining capacity, temperature, current, voltage, and the like), an engine rotation speed, a vehicle speed, and the like. These sensors transmit detection results to ECU 100.

ECU 100 includes therein a central processing unit (CPU) and a memory which are not shown. ECU 100 performs prescribed arithmetic processing based on information from each sensor and information stored in the memory, and controls each device of vehicle 1 based on an arithmetic result.

ECU 100 calculates traveling power required for vehicle 1 (hereinafter referred to as "required traveling power") based on the amount of depression of the accelerator pedal by the user and the like, and calculates charging power required for battery 22 (hereinafter referred to as "required charging power") based on the remaining capacity of battery 22, the operation state of the electric load, and the like. It should be noted that the charging power for battery 22 is provided by power generated by motor 20. Accordingly, the required charging power is equivalent to required power to be generated by motor 20.

ECU 100 calculates a value obtained by adding the required charging power to the required traveling power, as required engine power. ECU 100 determines an optimum gear stage (required gear stage) of automatic transmission 40 such that engine 10 can output the calculated required engine power.

In the configuration shown in FIG. 1, a rotation angle detected by a resolver 23 and transmitted to ECU 100 is used to control motor 20. Generally, an electric signal output by the resolver is an analog signal, and is converted, by a resolver-digital conversion circuit not shown, into a digital signal which can be subjected to arithmetic processing by a calculation device, and thereafter is output to ECU 100. ECU 100 detects (calculates) a rotation angle θm of the motor, using the digital signal from the resolver-digital conversion circuit.

It is known that an electric signal output by a resolver includes an error resulting from a gap between axial centers of a rotor and a stator of the resolver, or the like in order to control a motor with accuracy, it is desirable to perform learning control which corrects the error of the resolver and stores the result.

However, when an automatic transmission is incorporated into an output shaft of the motor, there is a possibility that an opportunity to correct the error of the resolver cannot be easily obtained. In order to perform the learning control of the resolver for the motor, a rotation speed of the motor should be more than or equal to a prescribed speed. If the vehicle accelerates quickly and travels at a high speed, the rotation speed of the motor quickly reaches the prescribed speed, and thus no problem occurs in particular. However, if the vehicle keeps traveling at a low speed, an opportunity to perform the learning control of the resolver cannot be easily obtained, which poses a problem.

This problem will be specifically described with reference to the drawings.

Figure 2:
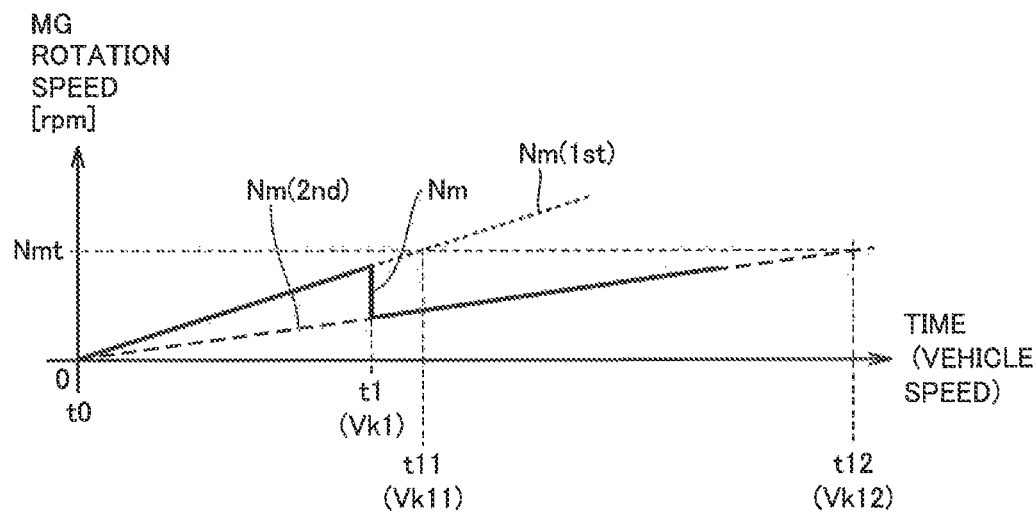
FIG. 2 is a view showing one example of the relation between a change in vehicle speed and a motor rotation speed.

FIG. 2 is a view showing one example of the relation between a change in vehicle speed and a motor rotation speed. FIG. 2 shows a case where the vehicle speed increases from time to in proportion to an increase in time. From time t0 to time t1, automatic transmission 40 is set to a first gear stage. During this period, the rotation speed of motor 20 increases with an increase in time. As the vehicle speed increases, the gear stage of automatic transmission 40 is shifted from the first stage to a second stage at time t1 (vehicle speed Vk1). Then, the rotation speed of motor 20 once falls, and increases after time t1.

Here, it is assumed that the learning control of resolver 23 can be performed when the rotation speed of motor 20 is more than or equal to a threshold value Nmt. When shift control is performed as shown in FIG. 2, the rotation speed of motor 20 does not exceed threshold value Nmt as long as the vehicle travels at a low speed of less than a vehicle speed Vk12, and thus an opportunity to perform the learning control of resolver 23 cannot be obtained. Accordingly, in the present embodiment, shift control different from the ordinary shift control is applied to automatic transmission 40 until the learning control of resolver 23 is completed.

Figure 3:
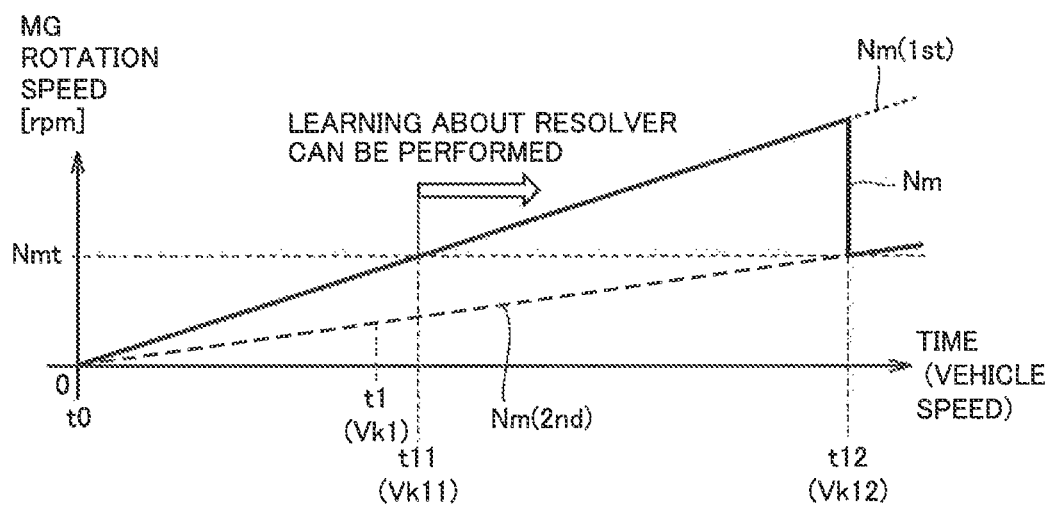
FIG. 3 is a waveform diagram for illustrating shift control performed in the present embodiment.

FIG. 3 is a waveform diagram for illustrating the shift control performed in the present embodiment. As shown in FIG. 3, in the present embodiment, automatic transmission 40 is controlled such that, until time t12, the gear stage is fixed to the first stage and shift to the second stage is not performed, even if the vehicle speed increases. In that case, the motor rotation speed exceeds threshold value Nmt after time t11, and thus the learning control of resolver 23 can be performed, and the learning control of resolver 23 is completed early.

It should be noted that shift is performed at time t12. The vehicle speed on this occasion is preferably a vehicle speed (referred to as Vk12) at which the motor rotation speed becomes more than or equal to threshold value Nmt even if the transmission is set to the second stage.

Then, when the learning control of resolver 23 is completed, the shift control of automatic transmission 40 is changed to the control as shown in FIG. 2. In FIG. 2, shift is performed at vehicle speed Vk1 (<Vk12).

When comparison is made between the shift stage before the learning control is completed (FIG. 3) and the shift stage after the learning control is completed (FIG. 2), at a prescribed vehicle speed, the transmission is set to the second stage in the control shown in FIG. 2, whereas the transmission is set to the first stage in the control shown in FIG. 3. Although the prescribed vehicle speed may be one point, it may also be a vehicle speed range having a prescribed width (Vk1 to Vk12 in FIG. 3).

It should be noted that the learning control does not necessarily have to be performed at the first shift stage. Therefore, when comparison is made between the shift stage before the learning control is completed and the shift stage after the learning control is completed to obtain an opportunity in which the rotation speed of the motor becomes more than or equal to threshold value Nmt at a prescribed vehicle speed, it is only necessary that there is a vehicle speed at which the shift stage before the leaning control is completed is set to be lower (i.e., to a lower stage) than the shift stage after the learning control is completed.

In other words, it is only necessary that there is a vehicle speed at which a shift stage while the learning control is performed (for example, the first stage, the second stage, or the like) is set to be lower (i.e., to a lower stage) than a shift stage while the learning control is not performed (for example, the second stage, a third stage, or the like).

Figure 4:
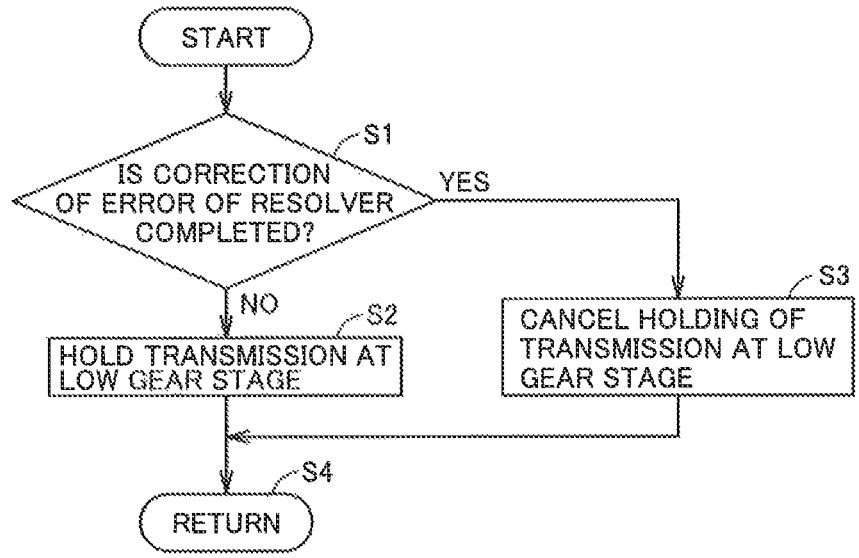
FIG. 4 is a flowchart for illustrating the shift control performed by an ECU in the present embodiment.

FIG. 4 is a flowchart for illustrating the shift control performed by the ECU in the present embodiment. The processing in the flowchart is invoked from a prescribed main routine and performed at regular time intervals or whenever prescribed conditions are satisfied. Referring to FIG. 4, in step S1, it is determined whether or not the learning control for correcting an error of resolver 23 is completed.

When the learning control for correcting the error of resolver 23 is not completed in step S1 (NO in step S1), the processing proceeds to step S2, and automatic transmission 40 is controlled to be held at a low gear stage. As a result, the time for which automatic transmission 40 is set to the first stage increases, as shown for example in FIG. 3.

On the other hand, when the learning control for correcting the error of resolver 23 is completed in step S1 (YES in step S1), the processing proceeds to step S3, and the control to hold automatic transmission 40 at the low gear stage is canceled. As a result, the time for which automatic transmission 40 is set to the first stage decreases, as shown for example in FIG. 2.

When the gear stage of the transmission is determined in either step S2 or step S3, the processing proceeds to step S4, and the control is returned to the main routine.

As described above, in the present embodiment, automatic transmission 40 is controlled such that the rotation speed of the motor becomes higher than the threshold value easily until the learning control for correcting the error of the resolver is completed. Accordingly, an opportunity to perform the learning control of the resolver can be obtained early.

Second Embodiment

Controlling the transmission such that the rotation speed of the motor becomes higher than the threshold value easily until the learning control for correcting the error of the resolver is completed can also be applied to electric vehicles. Since electric vehicles do not have an engine, most electric vehicles do not have an automatic transmission. However, even electric vehicles may incorporate an automatic transmission in order to enhance acceleration performance during high-speed traveling, and the like.

Figure 5:
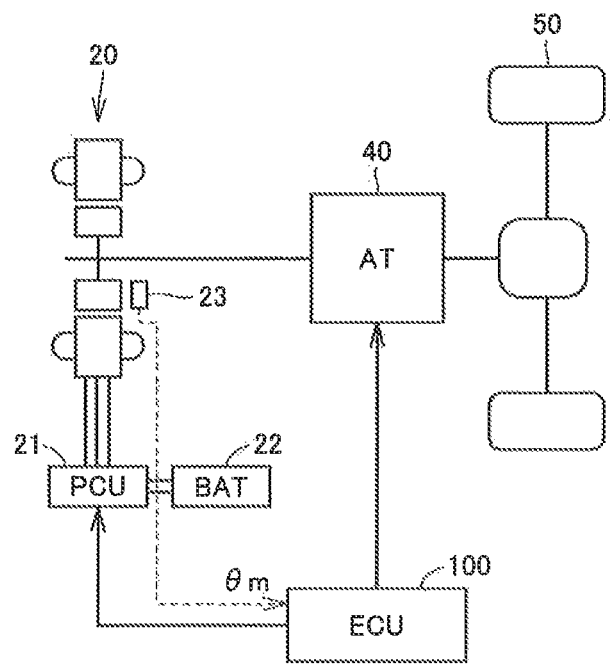
FIG. 5 is an overall configuration diagram of a vehicle 201 in a second embodiment.

FIG. 5 is an overall configuration diagram of a vehicle 201 in a second embodiment. Vehicle 201 includes motor 20, PCU 21, battery 22, automatic transmission 40, drive wheels 50, and ECU 100. Motor 20 includes resolver 23 for which learning control is performed.

Vehicle 201 is an electric vehicle having a configuration obtained by removing engine 10, clutch 12, and torque converter 30 from vehicle 1 shown in FIG. 1, and the description of each component will not be repeated here, as it is already provided in the first embodiment.

Even in an electric vehicle as shown in FIG. 5, an opportunity to perform the learning control of the resolver can be obtained early, by applying the controls shown in FIGS. 2 to 4 thereto.

Third Embodiment

Hybrid vehicles having a configuration including two motor generators are produced in large numbers. The invention of the present application is also applicable to a vehicle having such a configuration.

Figure 6:
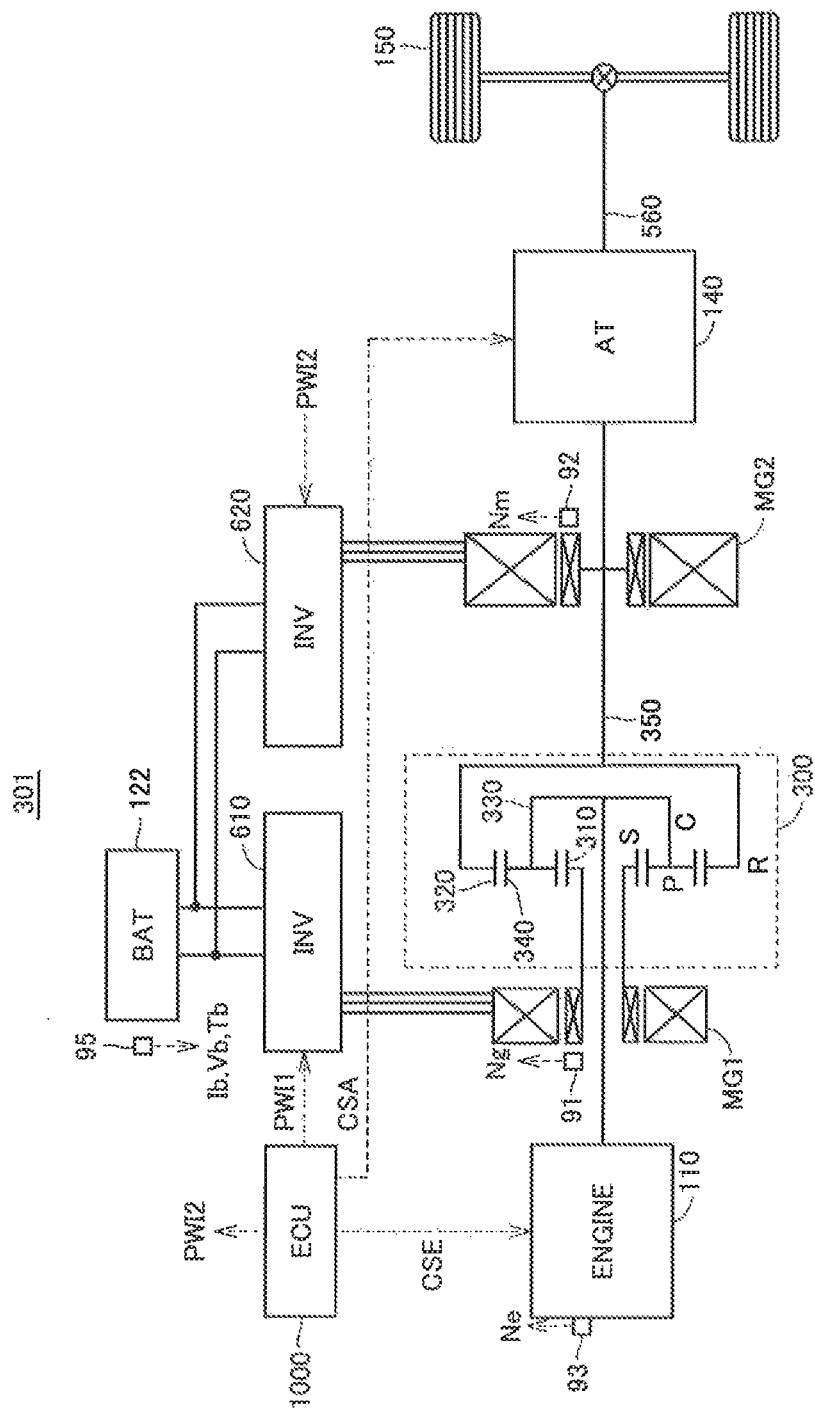
FIG. 6 is an overall configuration diagram of a vehicle 301 in a third embodiment.

FIG. 6 is an overall configuration diagram of a vehicle 301 in a third embodiment. Referring to FIG. 6, vehicle 301 includes an engine 110, motor-generators MG1 and MG2, inverters 610 and 620, a battery 122, a motive power split device 300, an automatic transmission 140, drive wheels 150, and an ECU 1000.

Engine 110 generates power for rotating drive wheels 150, based on a control signal CSE from ECU 1000. The power generated by engine 110 is input into motive power split device 300.

Motive power split device 300 splits the power input from engine 110 into power to be transmitted to drive wheels 150 through automatic transmission 140, and power to the transmitted to motor-generator MG1. Motive power split device 300 is a planetary gear mechanism (differential mechanism) including a sun gear (S) 310, a ring gear (R) 320, a carrier (C) 330, and pinion gears (P) 340. Sun gear (S) 310 is coupled to a rotor of motor-generator MG1. Ring gear (R) 320 is coupled to drive wheels 150 through automatic transmission 140. Pinion gears (P) 340 mesh with sun gear (S) 310 and ring gear (R) 320. Carrier (C) 330 holds pinion gears (P) 340 rotatably and revolvably. Carrier (C) 330 is coupled to a crankshaft of engine 110.

Each of motor-generators MG1 and MG2 is an AC rotating electric machine, and serves as a motor and also as a generator. Motor-generator MG2 is provided between motive power split device 300 and automatic transmission 140. More specifically, a rotor of motor-generator MG2 is connected to a drive shaft 350 which couples ring gear (R) 320 of motive power split device 300 and an input shaft of automatic transmission 140.

Automatic transmission 140 is provided between drive shaft 350 and a drive shaft 560. Namely, automatic transmission 140 is provided between motor-generator MG1 and drive wheels 150. Automatic transmission 140 is formed such that it can switch a gear ratio (i.e., the ratio of a rotation speed of the input shaft to a rotation speed of an output shaft) in an engaging state, to any of a plurality of predetermined shift stages (gear ratios), based on a control signal CSA from ECU 1000.

Inverters 610 and 620 are connected to battery 122 in parallel with each other. Inverters 610 and 620 are controlled by signals PWI1 and PWI2 from ECU1000, respectively. Inverters 610 and 620 convert DC power supplied from battery 122 into AC power to drive motor-generators MG1 and MG2, respectively.

Battery 122 stores the DC power for driving at least one of motor-generators MG1 and MG2.

Vehicle 301 further includes resolvers 91 and 92, an engine rotation speed sensor 93, and a monitoring sensor 95. Resolver 91 detects a rotation speed of motor-generator MG1 (hereinafter referred to as an "MG1 rotation speed Ng"). Resolver 92 detects a rotation speed of motor-generator MG2 (hereinafter referred to as an "MG2 rotation speed Nm"). Engine rotation speed sensor 93 detects a rotation speed of engine 110 (hereinafter referred to as an "engine rotation speed Ne"). Monitoring sensor 95 detects the state of battery 122 (such as a battery voltage Vb, a battery current Ib, and a battery temperature Tb). Each of these sensors outputs a detection result to ECU 1000.

ECU 1000 determines a target shift stage corresponding to a drive force and a vehicle speed V detected by a vehicle speed sensor not shown, with reference to a predetermined shift map, and controls automatic transmission 140 such that an actual shift stage becomes the target shift stage.

Figure 7:
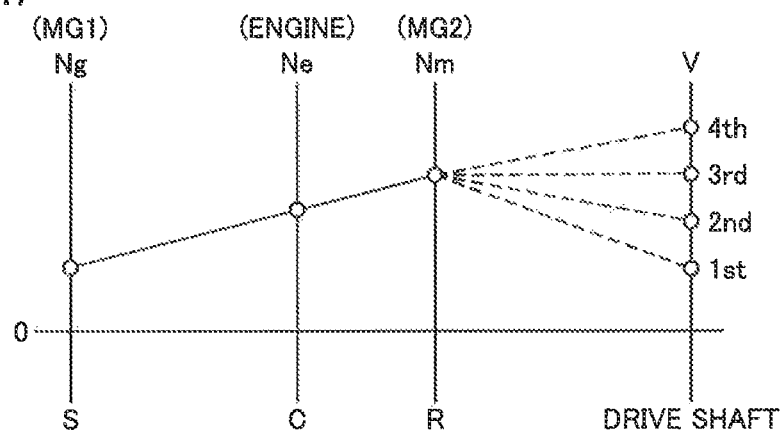
FIG. 7 is a view showing the relation between rotation speeds of motor generators and an engine and a rotation speed of a drive shaft.

FIG. 7 is a view showing the relation between the rotation speeds of the motor generators and the engine and a rotation speed of the drive shaft. Referring to FIG. 7, due to the action of motive power split device 300, MG1 rotation speed Ng, engine rotation speed Ne, and MG2 rotation speed Nm are aligned on a straight line in a nomographic chart. In contrast, automatic transmission 140 can change the relation between MG2 rotation speed Nm and the rotation speed of the drive shaft in four patterns as shown in FIG. 7, by changing setting from the first stage to a fourth stage.

Figure 8:
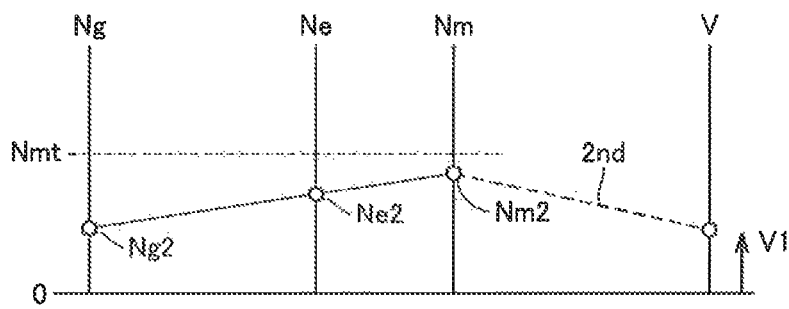
FIG. 8 is a view showing a state in which an automatic transmission is set to a second stage, and as a result, an MG2 rotation speed Nm does not exceed a threshold value Nmt at and above which learning control of a resolver can be performed.
Figure 9:
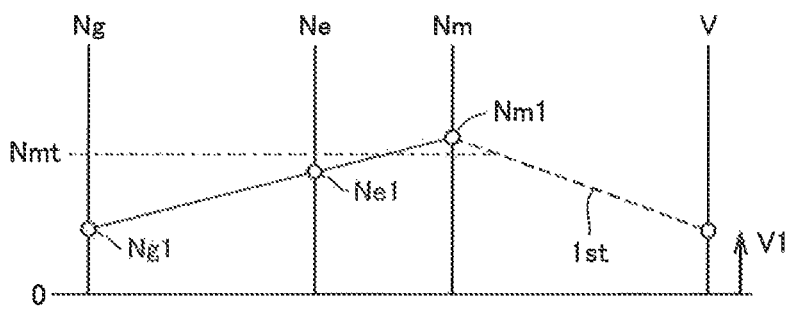
FIG. 9 is a view showing a state in which the automatic transmission is set to a first stage, and as a result, MG2 rotation speed Nm exceeds threshold value Nmt at and above which the learning control of the resolver can be performed.

FIG. 8 is a view showing a state in which the automatic transmission is set to the second stage, and as a result, MG2 rotation speed Nm does not exceed threshold value Nmt at and above which learning control of the resolver can be performed. FIG. 9 is a view showing a state in which the automatic transmission is set to the first stage, and as a result, MG2 rotation speed Nm exceeds threshold value Nmt at and above which the learning control of the resolver can be performed.

As shown in FIGS. 8 and 9, the vehicle having the configuration shown in FIG. 6 can change MG2 rotation speed Nm by changing the shift stage of automatic transmission 140, even at the same vehicle speed V1. Therefore, the same effect as that of the first embodiment can be achieved by applying the control shown in FIG. 4, and controlling automatic transmission 140 so as to select the first gear stage at vehicle speed V1 as shown in FIG. 9 before the learning control of the resolver is completed, and to select the second gear stage at vehicle speed V1 as shown in FIG. 8 after the learning control of the resolver is completed.

It should be noted that, although the first to third embodiments have described examples in which the transmission is a staged automatic transmission, the transmission is not limited thereto, and may be a transmission which can perform continuously variable transmission such as a CVT type transmission.

Although the embodiments of the present invention have been described, it should be understood that the embodiments disclosed herein are illustrative and non-restrictive in every respect. The scope of the present invention is defined by the scope of the claims, and is intended to include any modifications within the scope and meaning equivalent to the scope of the claims.

What is claimed is:

1. A vehicle, comprising:
   a motor;
   a resolver which detects a rotation angle of said motor;
   an automatic transmission which shifts rotation of said motor and transmits the shifted rotation to a drive shaft for rotating drive wheels; and
   a control device which performs learning control for correcting an error of said resolver and shift control of said automatic transmission, wherein
   said control device controls said automatic transmission at a prescribed vehicle speed such that a shift stage of said automatic transmission while said learning control is performed is set to be lower than a shift stage of said automatic transmission while said learning control is not performed.

2. The vehicle according to claim 1, wherein, before said learning control is completed, said control device controls said automatic transmission so as not to shift up a shift stage of said automatic transmission above a prescribed shift stage until a vehicle speed reaches a prescribed vehicle speed from zero, and, after said learning control is completed, said control device controls said automatic transmission so as to shift up the shift stage of said automatic transmission above said prescribed shift stage before the vehicle speed reaches said prescribed vehicle speed from zero.

3. The vehicle according to claim 1, wherein, before said learning control is completed, said control device fixes a shift stage of said automatic transmission to a first stage until a vehicle speed reaches a prescribed vehicle speed from zero, and, after said learning control is completed, said control device shifts up the shift stage of said automatic transmission from the first stage to a second stage before the vehicle speed reaches said prescribed vehicle speed from zero.

4. The vehicle according to claim 1, wherein said control device further performs drive control of said motor based on an output of said resolver.

5. The vehicle according to claim 1, further comprising an internal combustion engine.

6. The vehicle according to claim 5, further comprising a power generator which receives a torque of said internal combustion engine and generates electric power.

* * * * *